Patented Nov. 20, 1934

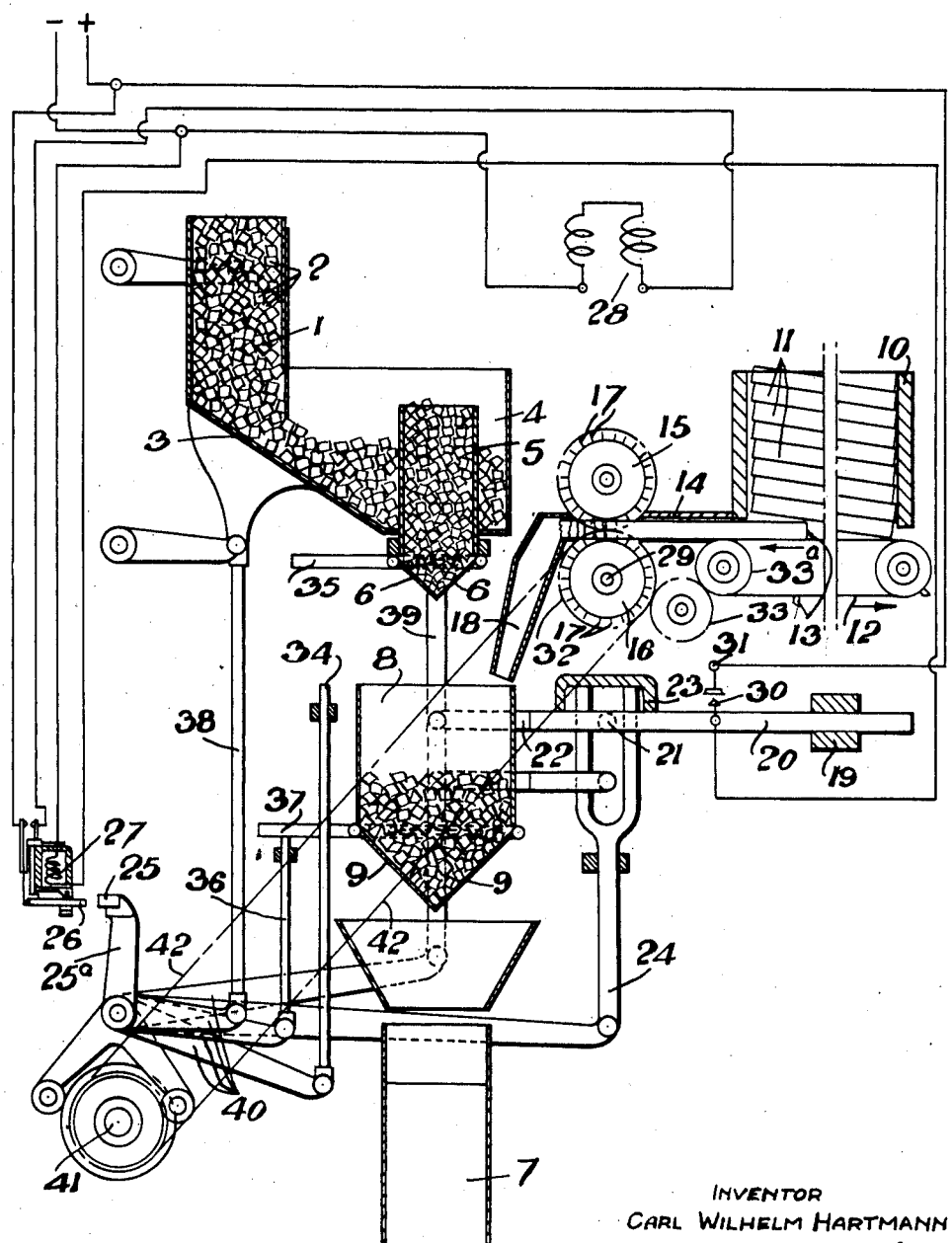

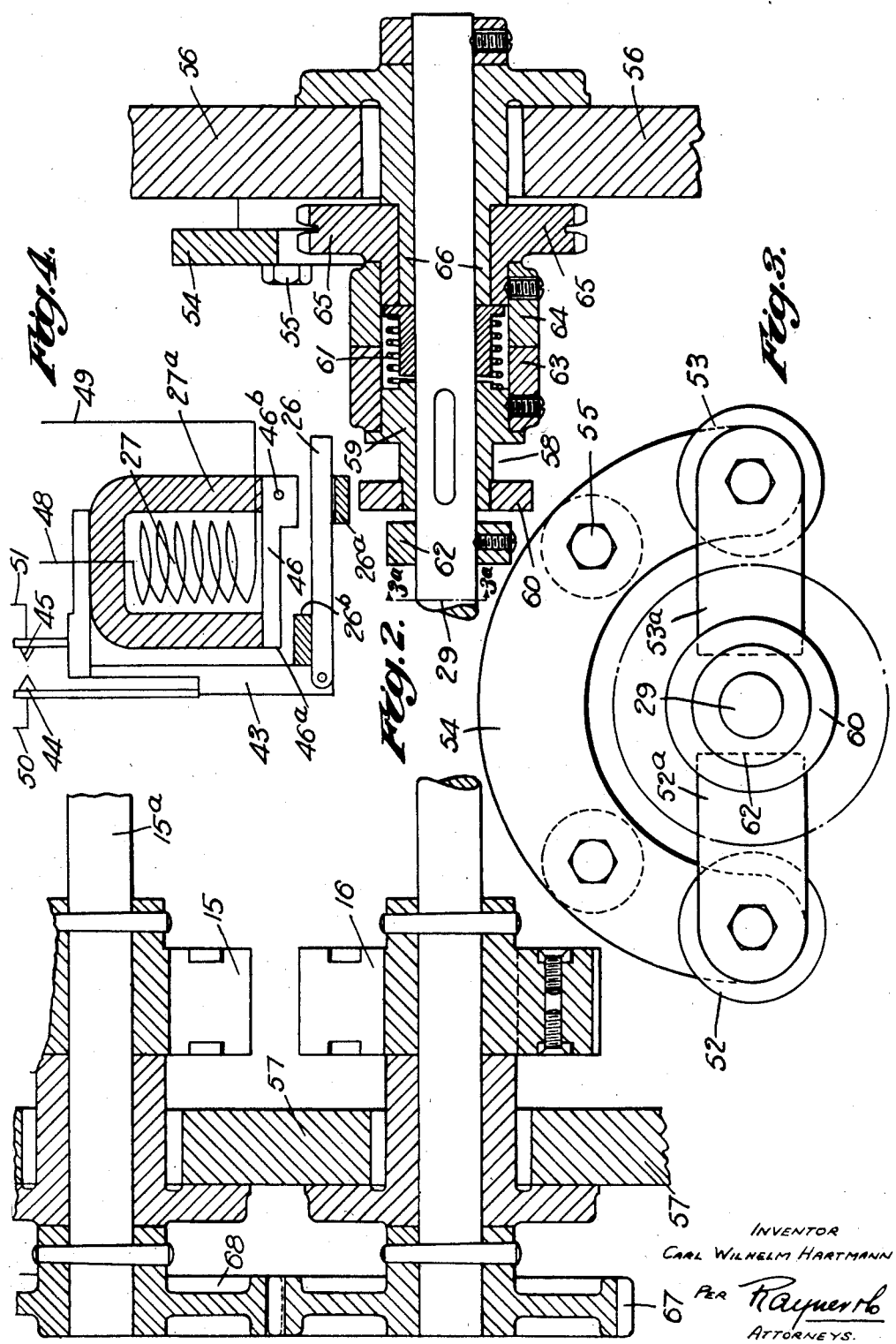

1,981,697

UNITED STATES PATENT OFFICE 1,981,697

AUTOMATIC MEASURING AND WEIGHING DEVICE

Carl Wilhelm Hartmann, Lyngby, near Copenhagen, Denmark

Application March 1, 1932, Serial No. 596,055
In Great Britain March 9, 1931

6 Claims. (Cl. 249—15)

This invention relates to improvements in automatic measuring and weighing devices and is particularly applicable to the weighing or measuring of lumps of material such as cube sugar or other materials in lump form which are usually packed in weighed or measured quantities.

The object of this invention is to enable materials in lumps or pieces, such for instance as lump sugar, to be automatically weighed or measured into predetermined quantities with considerable accuracy.

This invention is primarily intended for use in connection with the packing of lump sugar or other materials into packages or cartons and is especially useful in connection with automatic filling machines for packing the lump sugar or other material. Whilst the invention will be described as applied to a weighing or measuring device for lump sugar by way of example it is to be understood that it may also be employed for any other material in the form of numbers of lumps or pieces to which it may be conveniently applied.

According to one form of this invention the sugar or other material in the form of lumps or pieces is fed continuously into a hopper or chamber which communicates with a measuring chamber located over a scale or balance device for accurately weighing each measured quantity. The measuring chamber is provided with an opening covered by suitable doors preferably arranged at the lower end of the chamber and adapted to be closed whilst the quantity is being measured and to be opened to allow the roughly measured qauntity of lump sugar or other material to be transferred to the scale or balance for accurately weighing the quantity. Whilst the doors of the measuring compartment are opening, it is cut off from the bulk of the lump sugar or other material by suitable separating means.

The roughly measured quantity delivered to the scales or balance is arranged to be a suitable predetermined amount below the ultimate quantity required and is made up to the correct weight by the subsequent addition of lumps fed to the scales from a separate reservoir containing the material, preferably in the form of a rod or stick from the end of which the separate lumps are cut off automatically and delivered to the scales or balance until the correct weight of material is contained therein. As soon as the correct weight is obtained the supply of separate lumps will be automatically stopped and the accurately measured quantity may then be fed or transferred to the carton or package which is subsequently sealed either by hand or mechanical means. For this purpose the receptacle of the scales or balance containing the lump sugar or other material may be provided with suitable doors adapted to be opened to allow the measured quantity to fall or be transferred to the carton or package when the correct weight has been made up.

The means for feeding additional lumps to the roughly measured quantity preferably comprises a rod or stick of sugar or other material preferably mounted to slide in suitable guides. A short distance above the leading end of the stick is located a cutter or chisel adapted to cut off from the main stick a portion thereof. As the cutter separates a lump from the end of the stick, the severed lump is allowed to drop into the receptacle of the scales or balance. This action is automatically repeated until the quantity in the receptacle of the scale or balance is brought up to the correct amount when the action is automatically stopped and the accurately weighed quantity is transferred to the package or carton.

The operation of separating the roughly measured quantity from the bulk of the material by raising a scoop through the material and its transfer to the receptacle of the scale or balance, the subsequent feeding of a number of additional lumps to the roughly measured quantity until the correct weight is obtained and the subsequent transfer of the correctly weighed quantity to the carton or package may all be automatically controlled and carried out in the required sequence by suitable mechanism arranged to operate in unison.

In order that my invention may be clearly understood and readily carried into effect I have appended hereto two sheets of drawings somewhat diagrammatically illustrating an embodiment thereof, and wherein Fig. 1 is a diagrammatic sectional side elevation view showing the chief elements of the apparatus.

Fig. 2 is a detail sectional side elevation view showing a suitable form of magnetic clutch for bringing into and out of operation two cutters for removing pieces of sugar from a bar to supplement the roughly measured quantity of sugar.

Fig. 3 is a detail sectional end view on the line 3a—3a of Fig. 2, and

Fig. 4 is a detail side elevation view of an electrical relay device for making and breaking the circuit of the above mentioned magnetic clutch.

Referring to the appended drawings I have shown an elevated hopper 1 connected to any suitable source of supply for supplying sugar or other commodity, the commodity illustrated being in the form of cubes 2 of sugar which travel down an inclined base 3 of the hopper 1 into a vessel 4 from which the sugar is periodically extracted by a vertically reciprocating scoop 5 sliding in an aperture in the base of the vessel 4. The scoop 5 in its upward movement becomes fully charged with cubes of sugar and subsequently delivers its charge of sugar through doors 6 in its base, these doors being opened and closed automatically at the appropriate moments.

The amount of sugar picked up by and delivered from the scoop 5 is slightly less than the predetermined accurate quantity to be delivered into a carton 7 for retail purposes. The delivery of an accurately measured quantity of sugar into the carton 7 is effected by delivering the sugar from the scoop 5 into a weighing receptacle 8 interposed between the scoop 5 and support for the carton 7, and after such delivery to supplement the sugar in the receptacle 8 with the quantity required to achieve the correct predetermined weight of sugar. The base of the receptacle 8, having two doors 9 is then opened to deliver the correct quantity of sugar into the carton 7 which is then conveyed to means for sealing it.

The means for supplementing the approximately measured sugar delivered into the receptacle by the scoop 5 is shown for example as consisting of a magazine 10 in which is stacked a pile of substantially horizontal bars of sugar 11, the lowermost one of which rests upon an endless band 12 formed with any suitable number of fingers 13 adapted to engage the rear end of the said lowermost bar and urge it forwards along a tubular guide 14 between a pair of rotary cutters 15 and 16, the peripheries of which extend into the guide 14 and are formed with radial blades 17 adapted to sever cubes of sugar from the leading end of the said lowermost bar of sugar, the severed cubes being successively delivered into a chute 18 depending into the upper open end of the weighing receptacle 8.

The receptacle 8 is balanced by an adjustable weight 19 on a scale bar 20 fulcrumed at 21 and having a bifurcated end 22 supporting the receptacle 8. The bar 20 is held rigid when the receptacle 8 is being filled from the scoop 5 by means of a U shaped abutment 23 engaging the said bar at opposite sides of its fulcrum 21 and carried by a vertical arm 24 raised at the appropriate moment to release the bar 20 so that the loaded receptacle 8 is free to move downwards before the chute 18 has delivered the required supplement of cubes to balance the weight 19. At this stage an abutment 25 on the free end of an arm 25a engages the free end of a finger 26 supported on a guide 26a and fixed at one end to a resilient arm 43 whereby such finger 26 is urged outwards against the influence of its own resiliency so as to move an electrical contact 44 carried thereby into engagement with another contact 45 so as to close a circuit 50, 51 containing an electromagnet or solenoid 28 which when energized actuates a clutch on a shaft 29, such clutch being described with reference to Fig. 2. The slidable finger is held in the circuit closing position by the free end 46a of an armature 46 pivoted at 46b to a casing 27a accommodating an electro-magnet 27, the free end of such armature falling on to the finger 26 so as to form an abutment against a ledge 26b on the finger 26 to prevent the finger from moving back to the circuit breaking position until the electromagnet 27 is energized. The shaft 29 carries the lower cutting wheel 16 so by this means the cutters 15 and 16 are automatically brought into operation to supplement the sugar in the weighing receptacle 8 to the required amount, and when this required amount is reached the consequent descent of the receptacle 8 will raise a contact 30 on the bar 20 into engagement with a fixed contact 31 and thereby operate the electromagnet 27, these two contacts being included in a circuit 48, 49 containing the electromagnet 27 so that the armature 46 is raised to release the finger 26 whereby the circuit 50, 51 is broken so as to de-energize the electromagnet or solenoid 28 and disconnect the cutter 16 from the shaft 29. The cutter 16 carries with it a gear wheel 32 meshing with a gear wheel 33 driving a further gear wheel 33a on one of the shafts of the rollers over which the endless feeding band 12 travels.

The doors 6 of the scoop 5 are opened at the lowest point of travel of the scoop by means of a vertically reciprocated striker rod 34 pushed upwards against an arm 35 operating the doors 6. The doors 9 of the weighing receptacle 8 are similarly operated by a striker rod 36 pushed upwards against an arm 37 operating the doors 9. When the scoop 5 has discharged its contents the rod 34 is retracted and the doors 6 closed, at which stage the hopper 1 is agitated by a rod 38 reciprocated to shake the cubes into the vessel 4 and into the scoop 5, the weighing and delivery operation of the receptacle 8 taking place at this stage.

The scoop 5 is raised and lowered by an arm 39 which in common with the other reciprocated rods or arms 24, 34, 36, and 38 is operated from a common cam shaft 41 having one or more cams thereon operating levers 40 connected to the said rods or arms, the arrangement of the cams and levers being adjusted to effect the required sequence of operations. The shafts 41 and 29 are connected by a chain 42 and appropriate sprocket wheels for rotation in unison.

In Figs. 2 and 3 is shown a suitable form of the clutch operated by the solenoid or electromagnet which brings the shaft 29 into and out of operation, previously only diagrammatically shown in Fig. 1, and described as the member 28. It consists of two electro-magnets 52, 53, electrically coupled by an arcuate armature 54 bolted as at 55 to, but insulated from a part 56 of the machine frame in which part is supported one end of the shaft 29, the other end being supported in another frame member 57. Two pole pieces 52a and 53a are directed from the electromagnets into a space 58 in a collar 59 of non-magnetic material splined on the shaft 29 so that it can slide a limited distance thereon. This collar 59 carries an annular iron ring 60 adapted to be drawn towards or against the pole pieces 52a, 53a when the magnets are energized, this condition being shown in Fig. 2. The slidable collar 59 is normally urged by a coiled compression spring 61 against a non-magnetic stop 62 on the shaft 29 and such collar carries dogs 63 adapted to operatively engage dogs 64 carried by a spur gear wheel 65 rotating on a bearing 66 and driven by the chain 42. The spring normally separates the said dogs so that the spur wheel 65 rotates idly, but when the electromagnets are energized the collar 59 is slid against the influence of the spring 61 to engage the dogs 63 and 64 thereby coupling the wheel 65 positively to the shaft 29 which is geared by gear wheels 67, 68 to a shaft 15a carrying the cutter 15.

With a device constructed and operating according to this invention it is possible to automatically weigh or measure quantities of material with considerable accuracy and certainty. Since it is possible to weigh or measure the quantity to within one lump of the actual quantity required, a saving in the bulk of material may be effected when large quantities are being packed. This is due to the fact that where a device measures the quantity to within any three lumps of the accurate amount it is desirable to ensure that the amount is three lumps over and not less than the desired quantity so as to ensure that the customer obtains the amount which the package is specified to hold.

I claim:—

1. Automatic weighing or measuring apparatus comprising a hopper into which lumpy material is delivered, a scoop reciprocating in the base of said hopper, a weighing receptacle beneath said scoop, said weighing receptacle being movable under the influence of the weight of material delivered therein, and doors in the bases of said scoop and receptacle means for automatically successively opening said doors to transfer the contents of the scoop into the said weighing receptacle and from thence into a container, a magazine adapted to contain a supplementary supply of the lumpy material in bar form, means to sever lumps from the bar of supplementary material and to feed the severed pieces of said supplementary supply into said weighing receptacle until a predetermined weight of material is received in said receptacle, an electrical circuit, and means whereby when said receptacle is moved by the weight of material therein it makes said electrical circuit, electrically operated means being included in said circuit for stopping the means for feeding material from said supplementary supply.

2. Automatic weighing or measuring apparatus comprising a hopper into which lumpy material is delivered, a scoop reciprocating in the base of said hopper, a weighing receptacle beneath said scoop, said weighing receptacle being movable under the influence of the weight of material delivered therein, and doors in the bases of said scoop and receptacle means for automatically successively opening said doors to transfer the contents of the scoop into the said weighing receptacle and from thence into a container, a magazine containing a supplementary supply of the lumpy material in bar form, means to sever and feed pieces of said supplementary supply into said weighing receptacle until a predetermined weight of material is received in said receptacle, an electrical circuit means whereby when said receptacle is moved by the weight of material therein it makes said electrical circuit, electrically operated means being included in said circuit for stopping the means for feeding material from said supplementary supply, and means for automatically agitating said hopper immediately subsequently to the emptying of said scoop and the closure of the base of the scoop.

3. Automatic weighing or measuring apparatus comprising a hopper into which lumpy material is delivered, a scoop reciprocating in the base of said hopper, a weighing receptacle beneath said scoop, said weighing receptacle being movable under the influence of the weight of material delivered therein, and doors in the bases of said scoop and receptacle, means for automatically successively opening said doors to transfer the contents of the scoop into the said weighing receptacle and from thence into a container, a magazine containing a supplementary supply of the lumpy material, means to feed some of said supplementary supply into said weighing receptacle until a predetermined weight of material is received in said receptacle, an electrical circuit, means whereby when said receptacle is moved by the weight of material therein it makes said electrical circuit, electrically operated means being included in said circuit for stopping the means for feeding material from said supplementary supply, said feeding means including a guide co-operating with said magazine into which a bar of material is automatically delivered from said magazine, a cutter for severing successively short lengths of material from said bar, means for feeding said bar past the cutter, and means for delivering the severed portions into said receptacle.

4. Automatic weighing or measuring apparatus comprising a hopper into which lumpy material is delivered, a scoop reciprocating in the base of said hopper, a weighing receptacle beneath said scoop, said weighing receptacle being movable under the influence of the weight of material delivered therein, and doors in the bases of said scoop and receptacle, means for automatically successively opening said doors to transfer the contents of the scoop into the said weighing receptacle and from thence into a container, a magazine containing a supplementary supply of the lumpy material, means to feed some of said supplementary supply into said weighing receptacle until a predetermined weight of material is received in said receptacle, in electrical circuit and means whereby when said receptacle is moved by the weight of material therein it makes said electrical circuit, electrically operated means being included in said circuit for stopping the means for feeding material from said supplementary supply, said feeding means including a guide co-operating with said magazine into which a bar of material is automatically delivered from said magazine, a cutter for severing successively short lengths of material from said bar, means for feeding said bar past the cutter, means being provided for delivering the severed portions into said receptacle, an endless conveyor having one run travelling along said guide and adapted to support and feed the bar in said guide, said magazine being above one end of said guide and the cutter at the other end of the guide.

5. Automatic weighing or measuring apparatus comprising a hopper into which lumpy material is delivered, a scoop reciprocating in the base of said hopper, a weighing receptacle beneath said scoop, said weighing receptacle being movable under the influence of the weight of material delivered therein, and doors in the bases of said scoop and receptacle, means for automatically successively opening said doors to transfer the contents of the scoop into the said weighing receptacle and from thence into a container, a magazine containing a supplementary supply of the lumpy material, means to feed some of said supplementary supply into said weighing receptacle until a predetermined weight of material is received in said receptacle, an electrical circuit and means whereby when said receptacle is moved by the weight of material therein it makes said electrical circuit, electrically operated means being included in said circuit for stopping the means for feeding material from said supplementary supply, a weighing scale carrying said receptacle, and means preventing movement of the scale during preliminary loading of said receptacle.

6. Apparatus for automatically weighing or measuring lumpy material comprising two separate sources of supply, one containing the material in small bodies and the other containing the material in bar form, means for measuring a quantity of the material approximating the ultimate desired quantity in small bodies obtainable from one source of supply, means for automatically removing in succession pieces of material from a bar thereof at the other source of supply to supplement the measured quantity of the material to bring it to the desired quantity, the said two means being automatically operated in succession, the supplementing means including a magazine for bars of the material, said automatic removing means being operated in unison with and as part of said supplementing means.

CARL WILHELM HARTMANN.